LE ROY M. SMITH.
SCALE BEAM.
APPLICATION FILED AUG. 27, 1913.
1,131,165.
Patented Mar. 9, 1915.
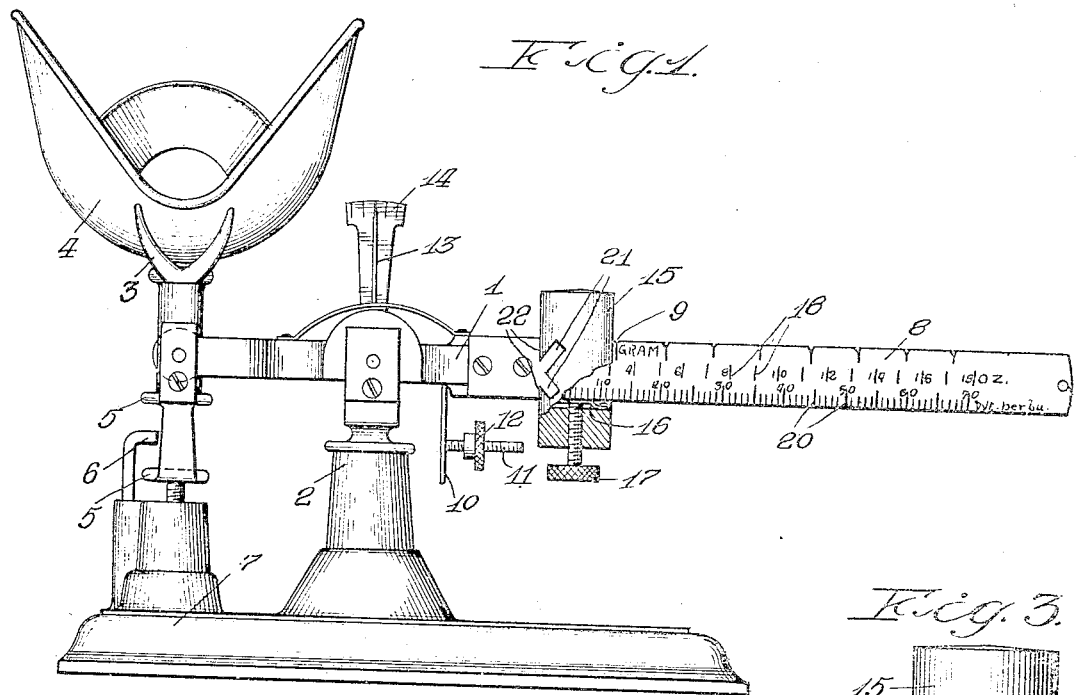
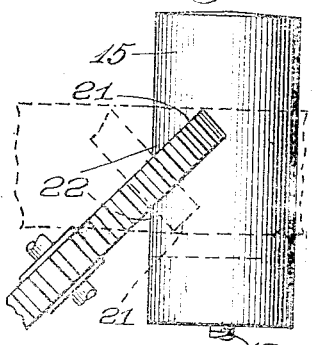
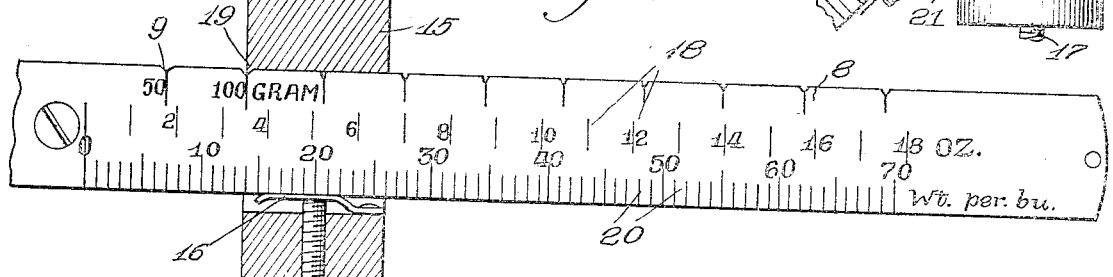
Witnesses:
Inventor
LeRoy M. Smith
By Lotz & Scheibl
Attys.

UNITED STATES PATENT OFFICE.

LE ROY M. SMITH, OF CHICAGO, ILLINOIS.

SCALE-BEAM.

1,131,165. Specification of Letters Patent. Patented Mar. 9, 1915.

Application filed August 27, 1913. Serial No. 786,863.

*To all whom it may concern:*

Be it known that I, LE ROY M. SMITH, citizen of the United States, residing at Chicago, in the county of Cook and State of Illinois, have invented certain new and useful Improvements in Scale-Beams; and I do hereby declare the following to be a full, clear, and exact description of the invention, such as will enable others skilled in the art to which it appertains to make and use the same.

My invention relates to scales and more particularly to the scale beams and sliding weights as used on balances equipped with scoops for weighing seeds or other small objects.

In certain classes of work, such as the testing of seeds, it has heretofore been necessary to use at least two, and sometimes three, separate scales or balances for determining the three important factors in which the weight enters in such testing. That is, a scale equipped with a small measuring cup or receptacle has been used for weighing out the fifty or hundred grams of seeds required in the determination of the percentage of moisture in the seeds; a second scale has been used whenever it was necessary to determine the weight in ounces of a given amount of seeds, and a third or computing scale for ascertaining the proportionate weight per bushel of the seeds filling the standard measure.

One object of my invention is to provide a scale beam with graduations enabling the same to be used either interchangeably or simultaneously for such varied purposes, without requiring special adjustments upon the scale or scale beam, which adjustments might be overlooked by the user of the scale or balance.

Another object is to provide means for interlocking the sliding weight with the scale beam at the test weights corresponding to the quantities of seeds required for moisture test determinations, thereby avoiding possible inaccuracies due to a lack of careful setting of the sliding weight, or variations due to the personal error in the setting as performed by different operators.

A further object is to provide a sliding weight permitting two of the scales upon the scale beam to be read with accuracy without obscuring the immediately adjacent graduations upon the said beam and without involving difficulties of manufacture which would increase the cost of construction of a sliding weight adapted to this purpose.

Still another object is to provide means for distributing the thrust of the locking screw carried by the sliding weight so as to prevent the tip of the said screw from indenting and marring the adjacent edge of the scale beam.

While the multi-graduated beam, the scale-disclosing weight, and the screw tip protector of my invention may all be used with scales or balances of widely varying constructions, they are particularly adapted for use on balances of the type shown in the accompanying drawings, in which—

Figure 1 is an elevation of a scale or balance equipped with my invention. Fig. 2 is an enlarged fragmentary view of the beam of the balance and of the sliding weight mounted thereon. Fig. 3 is a fragmentary sectional view showing the method of making the scale-disclosing openings in the sliding weight.

In the drawings, Fig. 1 shows a scale or balance consisting essentially of a beam 1 supported upon a standard 2 by a knife-edge or by a suitable torsion support, and carrying at one end a forked member 3 holding a removable brass scoop 4. The lower end of the forked member 3 preferably has stops 5 adapted to impinge against a prong 6 carried by the base 7, of the standard 2. Secured to the end of the scale beam 1 opposite to that supporting the said forked member and scoop is a detachable scale beam 8 having a plurality of graduations thereon and a plurality of notches 9 in its upper edge. The beam 1 also preferably has an arm 10 carrying a screw 11 upon which is threaded a nut 12, which latter may be moved toward, or away from, the standard 2 to adjust the balancing of the scale, the balancing point being preferably indicated by a pointer 13 mounted upon the beam 1 and moving over graduations upon an arcuate scale 14 carried by the standard 2. Slidably mounted upon the auxiliary or graduated portion 8 of the scale beam is a movable weight 15, which is preferably cylindrical in horizontal section and which has a rectangular perforation substantially equal in width to the thickness of the scale beam 8 and somewhat greater in height than the width of the said beam portion 8. Mounted within the said rectangular perforation upon the lower surface thereof is a spring 16, which normally is flexed out of contact with the lower edge of the beam 8 by its own resiliency, but which may be pressed into contact with the said lower edge by turning a screw 17 carried by the sliding weight 15.

Etched, stamped or otherwise marked upon the beam 8 and preferably approximately midway between its upper and lower edges thereof are graduations 18 corresponding to the avoirdupois weight of the contents of the scoop 4, that is, the weight in ounces and fractions of ounces of the contents of the scoop. This graduation enables the scale to be used after the ordinary fashion of balances by sliding the weight 15 until the pointer 14 indicates an even balance, and then reading the graduations of the scale 18 corresponding to the left-hand edge of the said weight 15.

The portion of the weight 15 forming the upper surface of the said rectangularly sectioned opening in the weight 15 has at its left-hand end a downwardly extending wedge-shaped portion 19, which portion is adapted to enter any one of the notches 9 in the upper edge of the beam 8 so as to interlock the weight 15 therewith. The notches 9 are preferably so positioned as to interlock with the weight 15 when the latter is in a position which will afford an even balancing of the scale when the scoop contains a standard quantity of seed, such as fifty or one hundred grams. Consequently, if the weight 15 is interlocked with the notch 9 at the 50 gram mark, the desired fifty grams of seeds may be quickly and accurately obtained by simply pouring seed into the scoop until the pointer 14 indicates an exact balance. In doing so, the interlocking of the notch 9 with the wedge-shaped projection 19 avoids any irregularity in the seating of the sliding weight and makes it unnecessary for the observer to use great care in the shifting of the said weight, as the same may easily be manipulated to secure the setting accurately even in poor light.

Upon the face of the beam 8, and preferably adjacent to the lower edge thereof, I also provide a series of decimally arranged graduations 20, the latter being computed to correspond to the weight per bushel of a standard volume of seed poured into the scoop 4. Consequently, to ascertain the weight per bushel of a given batch of seeds, it is only necessary to measure the standard quantity of the said seeds into the scoop 4 and to slide the weight 15 along the beam until the pointer 13 indicates an exact balance, whereupon the lower scale upon the beam will indicate the weight per bushel of the said seeds without requiring the operator to perform any calculations and without introducing the risk of error involved by such calculations. It will be obvious that in ascertaining this weight per bushel from the lower scale, the graduations immediately above this scale will indicate the weight in ounces of the seeds in the scoop, thereby enabling the operator to ascertain both this weight and the proportionate weight per bushel with a single setting of the sliding weight.

To enable the two lower graduations upon the beam to be easily and quickly read with accuracy, I preferably provide a pair of perforations 21 in the weight 15 extending transversely to the face of the beam 8 and at acute angles with the axis of the said beam. To make these perforations without involving expensive tools or without the risk of considerable breakage of tools, they may each be milled into the weight by exposing the latter to the action of a rotary cutter as shown in Fig. 3. It will be obvious from Fig. 1 that the diagonally disposed perforations thus provided in the weight 15 will disclose graduated portions of the beam which would otherwise be obscured by the body of the weight, while the pointed portions 22 of the weight adjacent to the common mouth of the said perforations will present a straight outer edge close to the graduations 18 and 20, thereby permitting the latter to be read with accuracy.

While I have shown and described the scale of my invention as graduated and used in connection with seed-testing manipulations, I do not wish to be limited to this particular adaptation, nor to the exact arrangement of the graduations or other details herein disclosed, it being obvious that the same might be varied in many ways without departing from the spirit of my invention. Neither do I wish to be limited to graduations reading in ounces, or in pounds per bushel, as other direct-reading and computed graduations might be substituted for these scales respectively; as for example, centigrams, or kilograms per liter.

I claim as new and desire to cover by Letters Patent:—

1. In a scale or balance, a beam equipped upon its face with graduations, in combination with a weight slidably mounted upon the said beam, there being coacting recess and projection formations disposed respectively upon the weight and one longitudinal edge of the beam for interlocking the weight and beam in predetermined relative positions, and friction means associated with said weight and the opposite longitudinal edge of the beam; said friction means coöperating with the said formations to hold the beam and weight interlocked in the said predetermined positions, and said friction means operating independently of the said formations for interlocking the beam and weight in positions other than said predetermined ones.

2. In a scale or balance, a beam equipped with direct-reading and proportionately computed graduations; in combination with a weight slidably mounted upon the said beam and enabling the said graduations to be read simultaneously; the said weight having a plurality of relatively angularly disposed openings transverse to the face of the beam and angularly disposed with reference to the axis of the beam, each of the said openings causing said weight to present an acute tip alining with one of the said graduations upon the beam.

In testimony whereof I have signed my name in presence of two subscribing witnesses.

LE ROY M. SMITH.

Witnesses:
ALBERT SCHEIBLE,
M. B. LANGE.